United States Patent [19]

Taira

[11] 4,253,726
[45] Mar. 3, 1981

[54] TRANSMISSION TYPE ILLUMINATION EQUIPMENT FOR MICROSCOPES

[75] Inventor: Akio Taira, Hachiouji, Japan

[73] Assignee: Olympus Optical Co., Ltd., Tokyo, Japan

[21] Appl. No.: 951,256

[22] Filed: Oct. 13, 1978

[30] Foreign Application Priority Data

Oct. 21, 1977 [JP] Japan .................................. 52-126433

[51] Int. Cl.³ ............................................. G02B 21/06
[52] U.S. Cl. ...................................................... 350/87
[58] Field of Search ...................................... 350/87–89, 350/86, 38–46, 12, 13

[56] References Cited

U.S. PATENT DOCUMENTS

| | | | |
|---|---|---|---|
| 3,137,761 | 6/1964 | Conradi et al. | 350/87 |
| 3,679,287 | 7/1972 | Takahaski et al. | 350/87 |
| 3,799,645 | 3/1974 | Stankewity | 350/38 |
| 3,833,283 | 9/1974 | Stankewity | 350/38 |
| 3,876,289 | 4/1975 | DeVeer et al. | 350/87 |
| 4,063,797 | 12/1977 | Taira | 350/87 |

*Primary Examiner*—John K. Corbin
*Assistant Examiner*—B. W. de los Reyes
*Attorney, Agent, or Firm*—Cushman, Darby & Cushman

[57] ABSTRACT

A transmission type illumination equipment for microscopes comprising a condenser lens for high magnification level and an aperture stop arranged in the vicinity of the front focal point of said condenser lens for high magnification level which are so arranged as to be replaceable with a condenser lens for low magnification level and an aperture stop arranged in the vicinity of said condenser lens for low magnification level respectively. Said illumination equipment for microscopes is so adapted as to form an image of the light source at the position of a corresponding aperture stop when it is switched for illumination between high and low magnification levels, thereby assuring illumination in favorable conditions from ultra-low to high magnification levels.

8 Claims, 11 Drawing Figures

TRANSMISSION TYPE ILLUMINATION EQUIPMENT FOR MICROSCOPES

BACKGROUND OF THE INVENTION (a) Field of the Invention

The present invention relates to a transmission type illumination equipment for microscopes which is so adapted as to permit favorable illumination from high to low magnification levels through a simple adjusting procedure.

(b) Description of the Prior Art

Conventionally, illumination equipments for microscopes which are so adapted as to be switchable from high to low magnification levels have been disclosed by U.S. Pat. No. 3,799,645, etc. Such a illumination equipment has such an optical system as shown in FIG. 1A in which the reference numeral 1 represents a light source, the reference numeral 2 designates a collector lens, the reference numeral 3 denotes a field stop, the reference numeral 4 represents an aperture stop arranged on an image 1' of said light source formed with said collector lens 2, the reference numeral 5 designates a condenser lens and the reference numeral 6 denote surface of an object to be observed. The optical components shown in FIG. 1A compose an illumination system for a high magnification level. The reference numerals 7 and 8 represents an auxiliary lens and another aperture stop which are arranged outside the optical path of the illumination system. In order to use this illumination system for microscopy at a low magnification level, the auxiliary lens 7 and aperture stop 8 which are placed outside the optical path when said illumination system is set for high magnification level are inserted into the optical path, and a portion 5a of the condenser lens 5 is removed from the optical path with the other portion 5b only left in the optical path. Though such an illumination system is usable from high to low magnification levels, adjustable range is inherently limited for it. Especially in the low magnification range, the illumination system is unusable at ultra-low magnification levels, e.g. 1×, due to the fact that it cannot provide a field of illumination having an area wide enough to cover the object surface, etc. though it is usable at low magnification levels down to 6× or so. For making this conventional illumination equipment usable at ultra-low magnification levels, the composition of the illumination system shown in FIG. 1B must be further modified. In such a case, however, it becomes impossible to compose a Köhler illumination system and, therefore, the equipment cannot be used in an illuminating condition in which the field stop and aperture stop operate effectively. The reason for this is that a telecentric illumination is required at a low magnification level and a lens having a sufficiently long focal length, for example, five to ten times as long as that of a condenser lens for a high magnification level is necessary as the condenser lens, and it is difficult to satisfy the above-mentioned condition when a lens group of a condenser lens system arranged relatively near object surface is employed for illumination for microscopy at a low magnification level.

SUMMARY OF THE INVENTION

A primary object of the present invention is to provide a transmission type illumination equipment for microscopes which comprises a condenser lens for high magnification level and an aperture stop for high magnification level which are interchangeable with a condenser lens for low magnification level and an aperture stop for low magnification level respectively, and an additional auxiliary lens which can be inserted into and removed from the optical path so as to form an image of the light source in the aperture stop when the condenser lens for high magnification level is replaced with a condenser lens for low magnification level, and which is so adapted as to illuminate object in favorable condition within a wide magnification range from an ultra-low level of 1× to a high level of 100×.

Another object of the present invention is to provide a transmission type illumination equipment for microscopes in which a field lens is arranged in the vicinity of the aperture stop for low magnification level so that each lens element may have a small diameter.

A further object of the present invention is to provide a transmission type illumination equipment for microscopes which comprises a condenser lens for high magnification level and an aperture stop for high magnification level which are so arranged as to be inserted into and removed from the optical path, an auxiliary condenser lens which can be displaced along the optical axis and an auxiliary lens which is so arranged as to be inserted into and removed from the optical path, and which is so adapted as to illuminate object in a favorable condition within a wide magnification range down to an ultra-low magnification level by displacing said auxiliary condenser lens in conjunction with insertion and removal of said condenser lens for high magnification level and, aperture stop for high magnification level.

DESCRIPTION OF THE PREFERRED EMBODIMENTS

Figure 1A:
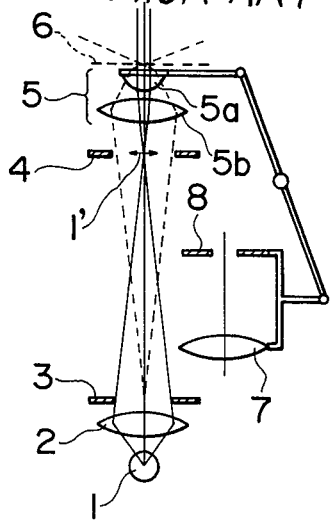
FIG. 1A and FIG. 1B show sectional views illustrating the composition of conventional illumination equipment for microscopes.
Figure 1B:
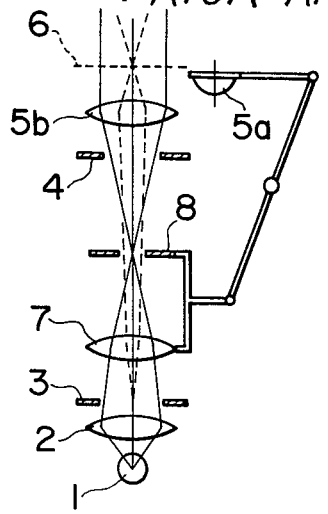
Figure 2A:
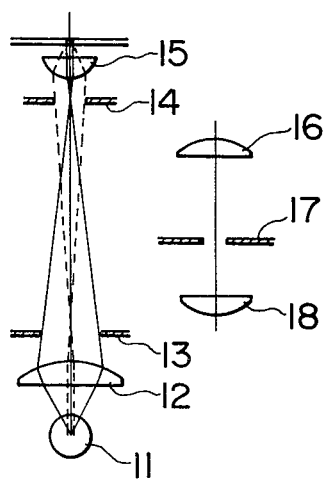
FIG. 2A and FIG. 2B show sectional views illustrating the composition of the illumination system of an embodiment of the present invention.
Figure 2B:
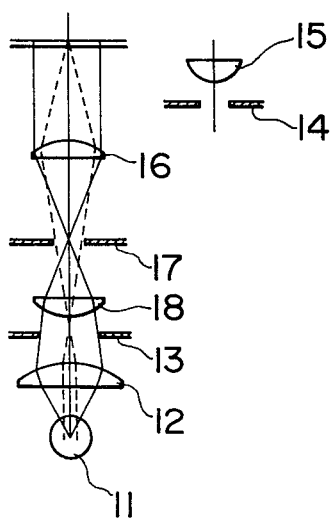

Now, some preferred embodiments of the present invention will be described in detail with reference to the accompanying drawings. FIG. 2A and FIG. 2B show a first embodiment of the present invention, the former illustrating the illumination equipment set for illumination for microscopy at a high magnification level, and the latter for illumination at a low magnification level. In these figures, the reference numeral 11 represents a light source, the reference numeral 12 designates a collector lens, the reference numeral 13 denotes a field stop, the reference numeral 14 represents an aperture stop for high magnification level, the reference numeral 15 designates a condenser lens for high magnification level, the reference numeral 16 denotes a condenser lens for low magnification level, the reference numeral 17 represents an aperture stop for low magnification level and the reference numeral 18 designates an auxiliary lens for low magnification level. In order to use the illumination system in combination with an objective lens for a high magnification level, the condenser lens for low magnification level 16, aperture stop for low magnification level 17 and auxiliary lens 18 are removed from the optical path of the illumination system as shown in FIG. 2A. For cooperating the illumination system with an objective lens for a low magnification level, in contrast, the condenser lens for low magnification level 16, aperture stop for low magnification level 17 and auxiliary lens 18 are inserted into the optical path, and the aperture stop for high magnification level 14 and condenser lens for high magnification level 15 are removed from the optical path.

Since the condenser lens for low magnification level 16 is arranged farther from the object to be observed than the condenser lens for high magnification level 15 as shown in the figures, it is possible to locate the rear focal point of the condenser lens for low magnification level nearly on the surface of said object and constitute a Köhler illumination system even when the condenser lens for low magnification level has a long focal length. Owing to the fact that a condenser lens having a long focal length is usable in the illumination system when it is set for microscopy at a low magnification level, it can provide illumination within a field of illumination wide enough to be compatible with an objective lens for an ultra-low magnification level.

Figure 3A:
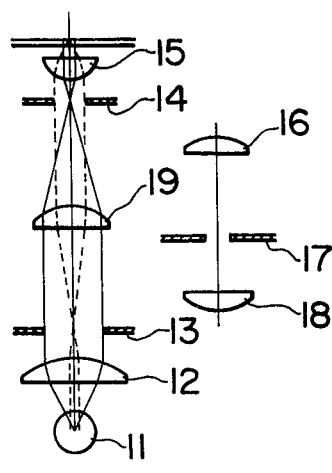
FIG. 3A and FIG. 3B show sectional views illustrating the composition of another embodiment of the present invention.
Figure 3B:
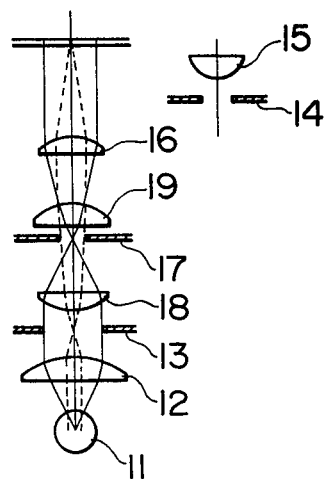

FIG. 3A and FIG. 3B show a second embodiment of the present invention, the former illustrating the illumination system set for microscopy at a high magnification level and the latter for a low magnification level. In this embodiment, a field lens 19 is arranged fixedly on the object side of the aperture stop for low magnification level with the other optical components being quite the same as those used in the Embodiment 1. The Embodiment 2 makes it possible to minimize lens diameters in the illumination system since the field lens 19 serves for restricting the pencil from diverging.

Figure 4A:
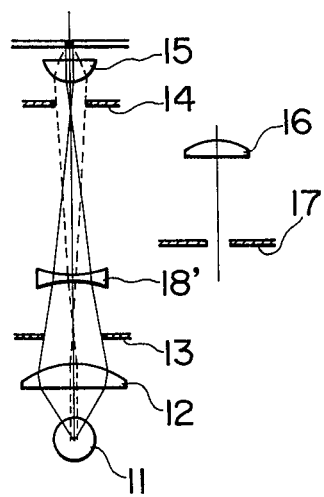
FIG. 4A and FIG. 4B illustrate sectional views showing the composition of a third embodiment of the present invention.
Figure 4B:
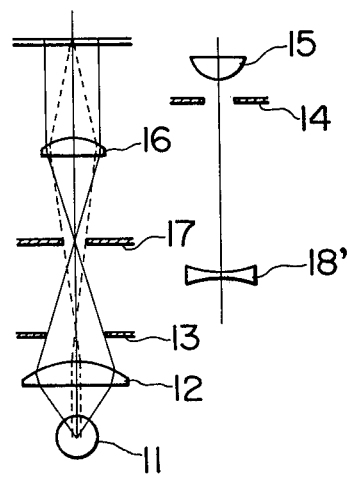

FIG. 4A and FIG. 4B illustrate a third embodiment in which an auxiliary lens for high magnification level 18' consisting of a concave lens is used in place of the auxiliary lens 18 consisting of a convex lens adopted in the first embodiment. Said auxiliary lens 18' is inserted into the optical path as shown in FIG. 4A when the illumination system is set for microscopy at a high magnification level. For setting the illumination system for observation at a low magnification level, the auxiliary lens 18' is removed from the optical path and the condenser lens for low magnification level is inserted into the optical path, in which condition microscopy at ultra-low magnification level becomes possible. That is to say, this embodiment is so designed as to form an image of the light source at the position of the aperture stop selected in accordance with magnification level of the objective lens to be used in combination with the illumination system.

Figure 5B:
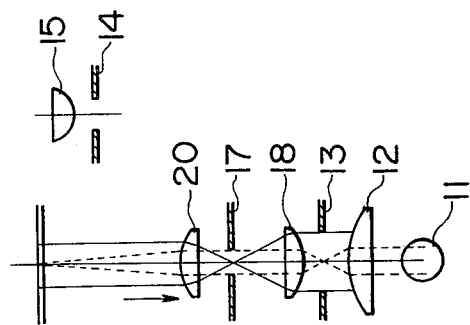
FIG. 5A and FIG. 5B illustrate sectional views showing the composition of a fourth embodiment of the present invention.
Figure 5A:
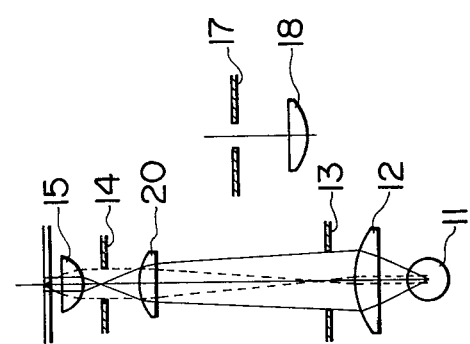

Finally, FIG. 5A and FIG. 5B visualize a fourth embodiment of the present invention in which an auxiliary condenser lens 20 is arranged in addition to the condenser lens for high magnification level 15 and displaced in the direction farther from the object to be observed when the illumination system is used in combination with an objective lens having a low magnification. That is to say, for switching the illumination system from the condition for microscopy at a high magnification level shown in FIG. 5A to the condition for low magnification level shown in FIG. 5B, the condenser lens for high magnification level 15 is removed from the optical path, the auxiliary lens 18 is inserted into the optical path, and the auxiliary condenser lens 20 is displaced in the direction indicated by the arrow, thereby producing an illuminating effect similar to that of the Embodiment 1.

That is to say, the fourth embodiment is adapted in such a way that said condenser lens 20 forms an image of the light source 11 in the vicinity of the aperture stop for high magnification level when the illumination equipment set for microscopy at a high magnification level as shown in FIG. 5A. For setting the illumination system for microscopy at a low magnification level as shown in FIG. 5B, the auxiliary condenser lens 20 is used as a condenser lens for low magnification level by displacing it until its front focal point is located in the vicinity of the aperture stop.

Figure 6:
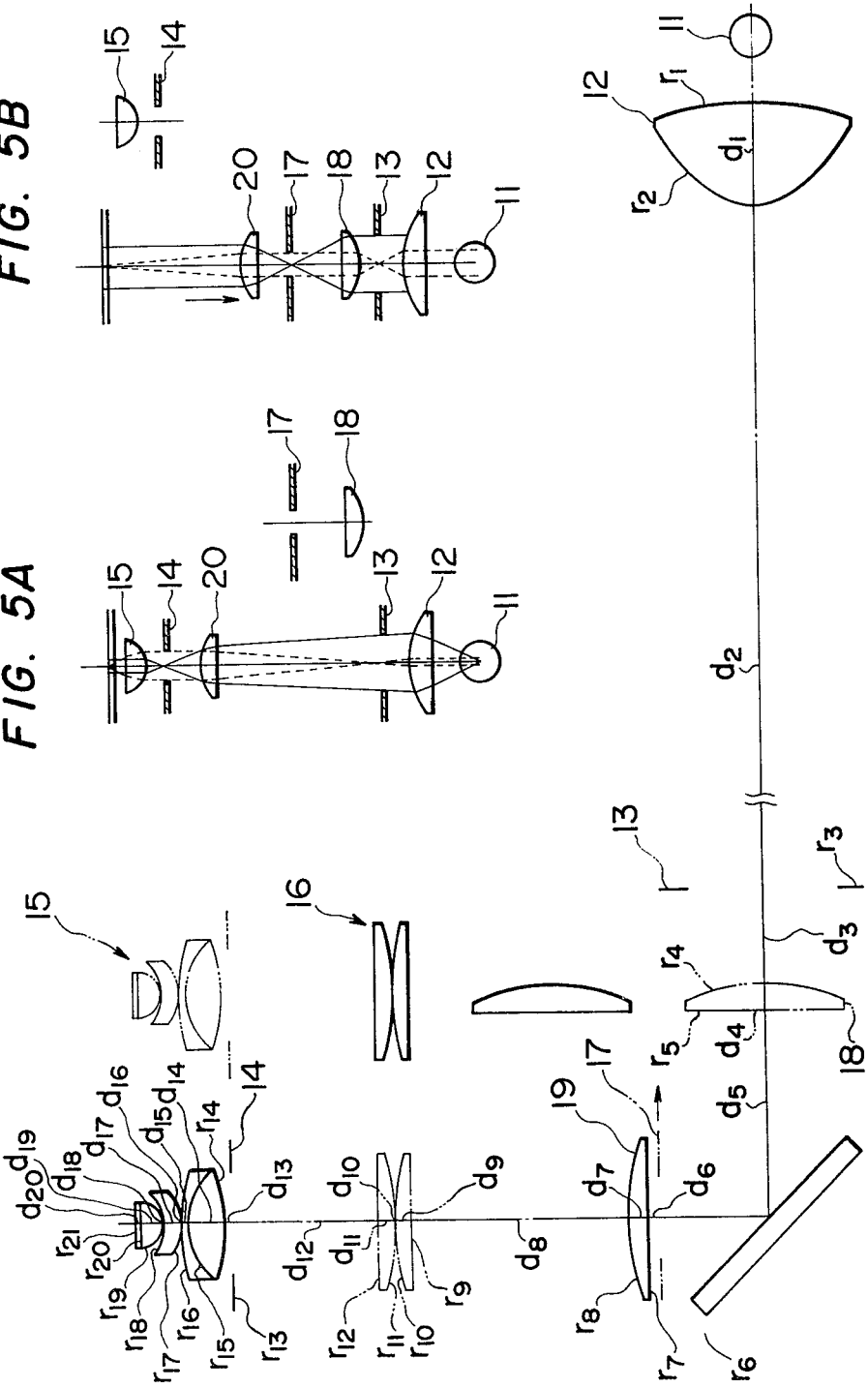
FIG. 6 illustrates a sectional view visualizing an example of concrete lens arrangement in the illumination equipment according to the present invention.

Though the aperture stop for high magnification level 14 and the aperture stop for low magnification level 17 are so arranged as to be removable from the optical path when they are unnecessary for illumination in the embodiments described above, it is possible to fix said aperture stops and open them so as not to hinder the illumination light when they are unnecessary for illumination. Further, it is preferable to adopt an interlocked mechanism which performs all the switching and/or displacing operations with a single procedure as the mechanism for switching the illumination system from the condition for microscopy at high magnification level to that for low magnification level, and vice versa. Among the embodiments described above, the third embodiment has such a lens arrangement concretely illustrated in FIG. 6 and numerical data detailed below:

$r_1 = 71.5$ $r_2 = -15.4$ (non spherical)

$r_3 = \infty$ (field stop)

$r_4 = 47.7$ $r_5 = \infty$ $r_6 = \infty$ (aperture stop for low magnification level)

$r_7 = \infty$ $r_8 = -59.4$ $r_9 = \infty$ $r_{10} = -66.8$ $r_{11} = 66.8$ $r_{12} = \infty$ $r_{13} = \infty$ (aperture stop for high magnification level)

$r_{14} = 35.6$ $r_{15} = -18.4$ $r_{16} = -48.2$ $r_{17} = 10.2$ $r_{18} = 12.1$ $d_1 = 24 \quad n_1 = 1.534 \quad \nu_1 = 55.5$ $d_2 = 170$ $d_3 = 23.3$ $d_4 = 6.5 \quad n_2 = 1.516 \quad \nu_2 = 64$ $d_5 = 79$ $d_6 = 3$ $d_7 = 5 \quad n_3 = 1.516 \quad \nu_3 = 64$ $d_8 = 54.6$ $d_9 = 4 \quad n_4 = 1.516 \quad \nu_4 = 64$ $d_{10} = 0.2$ $d_{11} = 4 \quad n_5 = 1.516 \quad \nu_5 = 64$ $d_{12} = 36$ $d_{13} = 1.6$ $d_{14} = 9.2 \quad n_6 = 1.620 \quad \nu_6 = 60.3$ $d_{15} = 1.4 \quad n_7 = 1.785 \quad \nu_7 = 25.7$ $d_{16} = 0.2$ $d_{17} = 4.6 \quad n_8 = 1.755 \quad \nu_8 = 52.3$ -continued

| | $d_{18} = 0.2$ | | |
|---|---|---|---|
| $r_{19} = 5.7$ | | | |
| | $d_{19} = 6.5$ | $n_9 = 1.552$ | $\nu_9 = 63.8$ |
| $r_{20} = -109.1$ | | | |
| | $d_{20} = 0.8$ | $n_{10} = 1.640$ | $\nu_{10} = 34.5$ |
| $r_{21} = \infty$ | | | | wherein the reference symbols $r_1$ through $r_{21}$ represent radii of curvature on the surfaces of the respective lenses, the reference symbols $d_1$ through $d_{20}$ designate thicknesses of the respective lenses and airspaces therebetween, the reference symbols $n_1$ through $n_{10}$ denote refractive indices of the respective lenses, and the reference symbols $\nu_1$ through $\nu_7$ represent Abbe's numbers of the respective lenses which are taken in the due sequence from the light source side including those placed outside the optical path. In this example of numerical data, the condenser lens for low magnification level 16 consists of two lens elements, whereas the condenser lens for high magnification level consists of three lens elements including a cemented doublet component.

I claim:

1. A transmission type Köhler illumination equipment for microscopes, comprising:
   a removably arranged condenser lens for high magnification level;
   an aperture stop for high magnification level which is removably arranged at the front focal point of said condenser lens for high magnification level;
   a removably arranged condenser lens for lower magnification level;
   an aperture stop for low magnification level which is removably arranged at the front focal point of said condenser lens for low magnification level; and
   a removably arranged auxiliary lens;
   said condenser lens for high magnification level and said aperture stop for high magnification level being inserted into the optical path of the illumination equipment when it is to be used for microscopy at a high magnification level, whereas said condenser lens for low magnification level and said aperture stop for low magnification level being inserted into the optical path of the illumination equipment in place of said condenser lens for high magnification level and said aperture stop for high magnification level;
   said condenser lens for low magnification level being inserted into the optical path at a point nearer the light source than said aperture stop for high magnification level when the illumination system is to be used for microscopy at a low magnification level;
   a field lens being arranged in the vicinity of the position into which said aperture stop for low magnification level is to be inserted.

2. A transmission type Köhler illumination equipment for microscopes, comprising:
   a removably arranged condenser lens for high magnification level;
   an aperture stop for high magnification level which is removably arranged at the front focal point of said condenser lens for high magnification level;
   a removably arranged condenser lens for low magnification level;
   an aperture stop for low magnification level which is removably arranged at the front focal point of said condenser lens for low magnification level; and
   a removably arranged auxiliary lens;
   said condenser lens for high magnification level and said aperture stop for high magnification level being inserted into the optical path of the illumination equipment when it is to be used for microscopy at a high magnification level, whereas said condenser lens for low magnification level and said aperture stop for low magnification level being inserted into the optical path of the illumination equipment in place of said condenser lens for high magnification level and said aperture stop for high magnification level;
   said condenser lens for low magnification level being inserted into the optical path at a point nearer the light source than said aperture stop for high magnification level when the illumination system is to be used for microscopy at a low magnification level;
   an additional auxiliary lens for low magnification being removably arranged in the optical path of said illumination equipment.

3. A transmission type Köhler illumination equipment for microscopes, comprising:
   a removably arranged condenser lens for high magnification level;
   an aperture stop for high magnification level which is removably arranged at the front focal point of said condenser lens for high magnification level;
   a removably arranged condenser lens for low magnification level;
   an aperture stop for low magnification level which is removably arranged at the front focal point of said condenser lens for low magnification level; and
   a removably arranged auxiliary lens;
   said condenser lens for high magnification level and said aperture stop for high magnification level being inserted into the optical path of the illumination equipment when it is to be used for microscopy at a high magnification level, whereas said condenser lens for low magnification level and said aperture stop for low magnification level being inserted into the optical path of the illumination equipment in place of said condenser lens for high magnification level and said aperture stop for high magnification level;
   said condenser lens for low magnification level being inserted into the optical path at a point nearer the light source than said aperture stop for high magnification level when the illumination system is to be used for microscopy at a low magnification level;
   an additional auxiliary lens for high magnification level being removably arranged in the optical path of said illumination equipment.

4. A transmission type illumination equipment for microscopes according to claim 3 wherein said auxiliary lens is a concave lens which is so adapted as to be inserted into the optical path when said illumination equipment is to be used for microscopy at a high magnification level and removed from the optical path when said illumination equipment is to be used for microscopy at a low magnification level.

5. A transmission type Köhler illumination equipment for microscopes, comprising:
   a removably arranged condenser lens for high magnification level;
   an aperture stop for high magnification level which is removably arranged at the front focal point of said condenser lens for high magnification level;
   a removably arranged condenser lens for low magnification level;

an aperture stop for low magnification level which is removably arranged at the front focal point of said condenser lens for low magnification level; and a removably arranged auxiliary lens;

said condenser lens for high magnification level and said aperture stop for high magnification level being inserted into the optical path of the illumination equipment when it is to be used for microscopy at a high magnification level, whereas said condenser lens for low magnification level and said aperture stop for low magnification level being inserted into the optical path of the illumination equipment in place of said condenser lens for high magnification level and said aperture stop for high magnification level;

said condenser lens for low magnification level being inserted into the optical path at a point nearer the light source than said aperture stop for high magnification level when the illumination system is to be used for microscopy at a low magnification level;

said illumination equipment being so adapted as to form, upon inserting and removing said auxiliary lens into and out of the optical path of said illumination equipment, an image of the light source substantially at the position of said aperture stop for high magnification level when said illumination equipment is to be used for microscopy at a high magnification level, and substantially at the position of the aperture stop for low magnification level when said illumination equipment is to be used for microscopy for a low magnification level.

6. A transmission type illumination equipment for microscopes according to claim 5 wherein said aperture stop for low magnification level is fixedly arranged in the optical path of said illumination equipment and is opened when said illumination equipment is to be used for microscopy at a high magnification level.

7. A transmission type illumination equipment for microscopes according to claim 5 wherein said aperture stop for high magnification level is fixedly arranged in the optical path of said illumination equipment and is opened when said illumination equipment is to be used for microscopy at a low magnification level.

8. A transmission-type Köhler illumination equipment for microscopes, comprising:

a removably arranged condenser lens for high magnification level;

an aperture stop for high magnification level which is removably arranged at the front focal point of said condenser lens for high magnification level;

an auxiliary condenser lens;

an aperture stop for low magnification level; and a removably arranged auxiliary lens;

said auxiliary condenser lens being movable so as to be positioned at different points in the optical path of the illumination equipment for microscopy at a high magnification level and a low magnification level;

said aperture stop for low magnification level being positioned at the front focal point of said auxiliary condenser lens for microscopy at a low magnification level;

said condenser lens for high magnification level and said aperture stop for high magnification level being inserted into the optical path of the illumination equipment and said auxiliary condenser lens being positioned at the point nearer said aperture stop for high magnification level when the illumination equipment is to be used for microscopy at a high magnification level, whereas said condenser lens for high magnification level and said aperture stop for high magnification level being removed from the optical path of the illumination equipment, said auxiliary condenser lens being moved toward the light source from its position for microscopy at a high magnification level, and said aperture stop for low magnification level and said auxiliary lens being inserted into the optical path of the illumination equipment when it is to be used for microscopy at a low magnification level.

* * * * *